(12) United States Patent
Kohonen et al.

(10) Patent No.: US 9,302,653 B2
(45) Date of Patent: Apr. 5, 2016

(54) METHOD AND POLISHING DEVICE FOR POLISHING A VEHICLE TYRE

(71) Applicant: TAMMERMATIC OY, Tampere (FI)

(72) Inventors: Ari Kohonen, Pirkkala (FI); Arto Mäkelä, Ylöjärvi (FI)

(73) Assignee: TAMMERMATIC OY, Tampere (FI)

( * ) Notice: Subject to any disclaimer, the term of this patent is extended or adjusted under 35 U.S.C. 154(b) by 0 days.

(21) Appl. No.: 14/078,088

(22) Filed: Nov. 12, 2013

(65) Prior Publication Data

US 2014/0170324 A1    Jun. 19, 2014

(30) Foreign Application Priority Data

Dec. 17, 2012  (FI) .................................... 20126317
May 14, 2013  (EP) .................................... 13167571

(51) Int. Cl.
*B60S 3/06* (2006.01)
*B60S 3/04* (2006.01)
*B05B 15/04* (2006.01)

(52) U.S. Cl.
CPC ............ *B60S 3/042* (2013.01); *B05B 15/0487* (2013.01)

(58) Field of Classification Search
CPC ....................................................... B60S 3/042
USPC ............ 15/29, 50.1, 53.4; 118/301, 304, 313, 118/323, 255; 134/184, 198, 123; 239/750, 239/592–594, 597, 598
See application file for complete search history.

(56) References Cited

U.S. PATENT DOCUMENTS

| | | | | |
|---|---|---|---|---|
| 1,931,893 A | * | 10/1933 | Fleming et al. ................. 15/29 |
| 2,612,648 A | * | 10/1952 | Lagant ........................... 15/50.1 |
| 2,718,650 A | * | 9/1955 | Haverberg ..................... 15/53.4 |
| 4,269,141 A | * | 5/1981 | Kennett ........................ 118/708 |
| 4,878,262 A | * | 11/1989 | Stufflebeam et al. ......... 15/53.4 |
| 4,985,957 A | * | 1/1991 | Belanger et al. .............. 15/53.4 |
| 6,270,586 B1 | * | 8/2001 | Soble ............................ 134/32 |
| 6,383,295 B1 | | 5/2002 | Frederick, Jr. et al. |
| 7,582,164 B1 | | 9/2009 | Krause et al. |
| 2007/0068554 A1 | | 3/2007 | Essenburg |
| 2008/0187674 A1 | * | 8/2008 | Wentworth et al. ........... 427/429 |
| 2009/0199880 A1 | | 8/2009 | Wentworth et al. |
| 2010/0272370 A1 | | 10/2010 | Schilling et al. |
| 2010/0272916 A1 | | 10/2010 | Falbaum et al. |
| 2013/0186432 A1 | | 7/2013 | Wimmer |

FOREIGN PATENT DOCUMENTS

| | | |
|---|---|---|
| DE | 10 2008 034 570 A1 | 2/2010 |
| DE | 10 2010 036 190 A1 | 3/2012 |
| EP | 0752353 A1 | 1/1997 |

(Continued)

OTHER PUBLICATIONS

Purkamo-Uutiset Mar. 2012; p. 21.

(Continued)

*Primary Examiner* — Mark Spisich
(74) *Attorney, Agent, or Firm* — Oliff PLC (57) ABSTRACT

A method and polishing device for polishing a vehicle tire. A polishing agent application means is moved in relation to a tire of a stationary vehicle and polishing agent is applied on the side of the vehicle tire as the application means moves in relation to the tire of the stationary vehicle.

9 Claims, 4 Drawing Sheets

(56) References Cited

FOREIGN PATENT DOCUMENTS

| | | | |
|---|---|---|---|
| EP | 2 077 211 A1 | | 7/2009 |
| EP | 2 243 672 A1 | | 10/2010 |
| JP | 4-212660 | * | 8/1992 |
| JP | 8-253109 | * | 10/1996 |
| JP | 2002-29394 | * | 1/2002 |
| KR | 20110126370 A | | 11/2011 |
| WO | 93/03944 A1 | | 3/1993 |
| WO | 2009/111350 A2 | | 9/2009 |

OTHER PUBLICATIONS

Oct. 2, 2015 Notice of Opposition issued in Finnish Patent No. 125289.

* cited by examiner

METHOD AND POLISHING DEVICE FOR POLISHING A VEHICLE TYRE

BACKGROUND OF THE INVENTION

The invention relates to polishing a vehicle tyre.

Various automatically operated washing apparatuses are used in automatically washing vehicles. The washing apparatus may comprise one or more fixedly positioned washing devices, for instance, in relation to which a vehicle moves while the washing device washes the surface or part of the vehicle facing the washing device. The washing apparatus may also comprise one or more movably positioned washing devices that are arranged to move in relation to a stationary vehicle.

The washing apparatuses described above may also have a polishing device for polishing the side of a vehicle tyre. A known polishing device has long foam-plastic pieces which are fixed to a floor structure and to which polishing agent is sprayed from the inside. As the vehicle moves through the polishing device, the foam-plastic pieces are pressed against the side of the tyre in its bottom part, whereby the polishing agent rubs onto the tyre. The side of the tyre on its entire circumference is polished as, while the vehicle moves forward, the tyre rotates at least once around its entire circumference with the foam-plastic pieces pressing against the side of the tyre in its bottom part.

In another known polishing device, said foam-plastic pieces are replaced by long and narrow rotating brushes in the longitudinal direction of the vehicle. Polishing agent is sprayed to the rotating brush that rubs it into the side of the tyre in its bottom part. In this solution, too, the side of the tyre on its entire circumference is polished as, while the vehicle moves forward, the tyre rotates at least once around its entire circumference with the brushes pressing against the side of the tyre in its bottom part.

A third known polishing device has a spray nozzle arranged on a guide rail fastened to the floor. As the vehicle moves forward through the polishing device, the spray nozzles also moves forward on its guide rail with the vehicle tyre and sprays polishing agent on the side of the tyre in its bottom part. The side of the tyre on its entire circumference is polished as, while the vehicle moves forward, the tyre rotates at least once around its entire circumference with the spray nozzle spraying polishing agent on the side of the tyre in its bottom part.

A fourth known polishing device comprises in the longitudinal direction of a vehicle several consecutively positioned fixed spray nozzles for spraying polishing agent on the tyre. The polishing device further comprises a switch runner which is positioned on the floor and on which the vehicle moves forward. As the tyre of the vehicle arrives at a specific switch in the switch runner, the spray nozzle corresponding to said switch sprays polishing agent on the side of the tyre in its bottom part. The side of the tyre on its entire circumference is polished as, while the vehicle moves forward, the tyre rotates at least once around its entire circumference and as the vehicle tyre arrives at switch on the switch runner, the switch directs the corresponding spray nozzle to spray polishing agent on the side of the tyre in its bottom part.

BRIEF DESCRIPTION OF THE INVENTION

The object of this invention is to develop a novel type of method and polishing device for polishing a vehicle tyre.

In the method for polishing a vehicle tyre in accordance with the invention, at least one vehicle tyre polishing agent application means is moved in relation to a tyre of a stationary vehicle and polishing agent is applied on the side of the vehicle tyre as the application means moves in relation to the tyre of the stationary vehicle.

The polishing device for polishing a vehicle tyre in accordance with the invention comprises at least one application means for applying polishing, agent on the side of a vehicle tyre, the application means being arranged to move in relation to the tyre of the stationary vehicle.

In the solution, at least one polishing agent application means for a vehicle tyre is moved in relation to a tyre of a stationary vehicle and the polishing agent is applied to the side of the vehicle tyre as the polishing agent application means moves in relation to the tyre of the stationary vehicle.

The solution may be implemented with a structurally simple and thus also reliable polishing device that may be an independently operating device or that may easily be integrated as part of a portal type washing apparatus, for instance, in which case the solution is easy to take into use through retrofitting into washing apparatuses already in use. At the same time, it is possible to avoid a problem that occurs in some prior-art solutions, that is, the extension of the length of the space reserved for the washing apparatus or of the wash tunnel due to the fact that that it is necessary to reserve an extra distance of at least about three meters for the polishing device, so that the vehicle tyre can rotate at least once around as the vehicle moves forward during the polishing of the tyre.

Some embodiments of the solution are disclosed in the dependent claims.

According to an embodiment, the application means for the polishing agent of a vehicle tyre is moved in relation to the tyre of a stationary vehicle along an annular path formed by the side of the vehicle tyre.

According to an embodiment, the polishing agent is applied to the side of a vehicle tyre by spraying it on the vehicle tyre.

According to an embodiment, the polishing agent spray is directed to a vehicle tyre as a narrow fan-shaped spray.

According to an embodiment, the spray distance of the polishing agent from a vehicle tyre is altered on the basis of the tyre size and/or profile.

According to, an embodiment, the rim of a vehicle tyre is covered during the application of the polishing agent to prevent the polishing agent from spreading on the rim of the vehicle tyre.

BRIEF DESCRIPTION OF THE FIGURES

The invention will now be described in greater detail by means of preferred embodiments, with reference to the accompanying drawings, in which.

In the figures, some embodiments of the invention are shown simplified for the sake of clarity. Like reference numerals identify like elements in the figures.

DETAILED DESCRIPTION OF THE INVENTION

Figure 1:
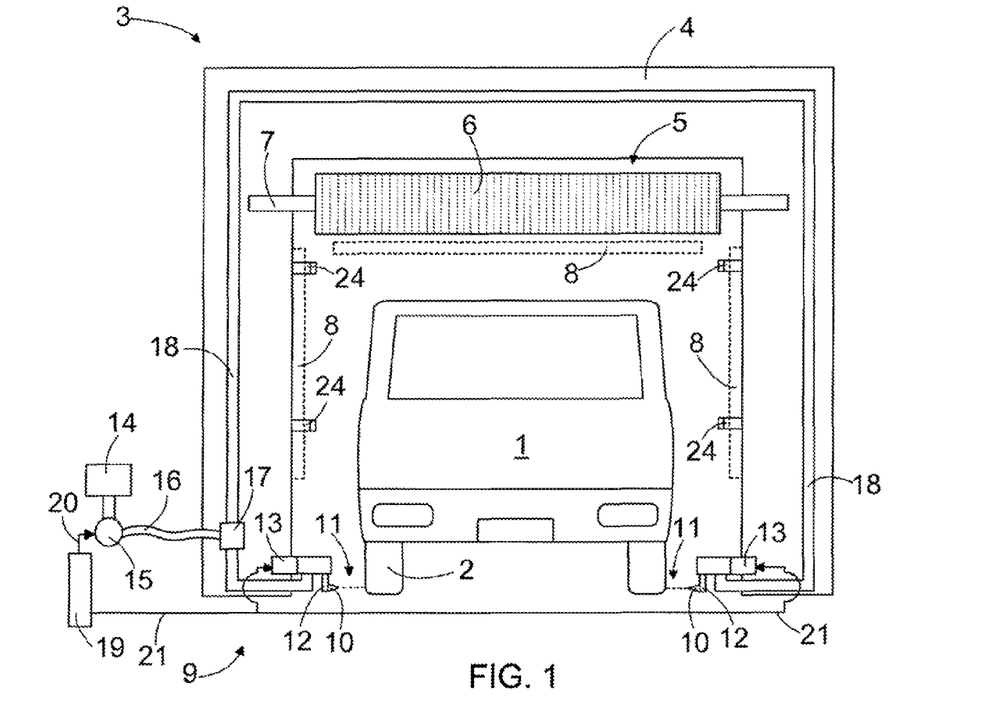
FIG. 1 is a schematic front view of a vehicle washing apparatus with a vehicle tyre polishing device connected thereto.
Figure 2:
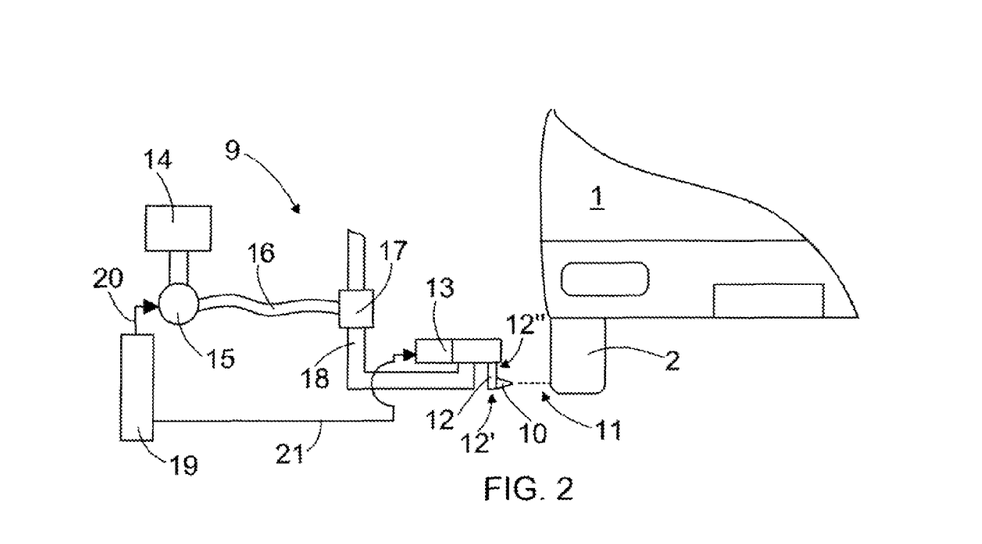
FIG. 2 is a schematic front view of a part of FIG. 1.

FIG. 1 is a schematic front view of a vehicle 1 washing apparatus 3 with a vehicle 1 tyre 2 polishing device 9, and FIG. 2 is a schematic front view of a part of FIG. 1. The washing apparatus 3 of FIG. 1 comprises a portal-type framework 4 that is arranged to move on rails, for instance, on site in such a manner that during the washing of a vehicle 1, the framework 4 of the washing apparatus 3 moves in the longitudinal direction of the vehicle 1 while the vehicle 1 remains stationary. For the sake of clarity, said rails and means for moving the framework 4 of the washing apparatus 3 on said rails are not shown in the figures.

The washing apparatus 3 of FIG. 1 consists of a roof unit to that is supported on the framework 4 and in the washing apparatus 3 of FIG. 1 forms a vehicle 1 washing device that is intended to wash the upward directed surfaces of the vehicle and possibly the front and rear ends of the vehicle. The roof unit 5 comprises a washing brush 6 and its axle 7 that may be rotated by means of an electric motor not shown in FIG. 1 for the sake of clarity. The washing apparatus 3 of FIG. 1 also includes air nozzles 8 for drying the vehicle 1 by blow drying, that is, by blowing air toward the vehicle 1. The washing apparatus 3 may also include other washing devices, such as brushes and electric motors to rotate them for washing the sides of the vehicle 1. In addition to or instead of the washing devices equipped with brushes for washing the sides of a car, the washing apparatus 3 may comprise washing devices equipped with washing nozzles for brushless washing of vehicles 1. The general structure and operational principle of automatically operated washing apparatuses of this type, which are arranged to move in relation to a stationary vehicle, are known per se to a person skilled in the art and will not be described in more detail herein.

FIG. 1 also shows a polishing device 9 for polishing the vehicle 1 tyre 2, in practice, for polishing the side 2' of the vehicle 1 tyre 2. The polishing of the side 2' of the vehicle 1 tyre 2 is typically done during the washing of the vehicle 1, either simultaneously with the washing of the vehicle or immediately thereafter.

The polishing device 9 includes spray nozzles 10 located on both sides of the vehicle 1 and arranged to direct the polishing agent spray 11 to the tyre 2 of the vehicle. The spray nozzles 10 are arranged at the outermost end 12' of a nozzle arm 12 that is in the direction of the radius of the vehicle 1 tyre 2. The nozzle arm 12 is a tubular structure, in which the inside of the nozzle arm 12 forms a flow channel for supplying polishing agent through the nozzle arm 12 to the spray nozzle 10 in a manner to be described later. The spray nozzle 10 can be a separate part attached to the outermost end 12' of the nozzle arm 12, or the spray nozzle 10 can also be achieved merely by the structural design of the outermost end 12' of the nozzle arm 12.

The polishing device 9 also includes a rotating motor 13, to which the nozzle arm 12 is arranged through the inner end 12 of the nozzle arm 12 in such a manner that the rotating motor 13 may rotate the spray nozzle 10 at the outermost end 12' of the nozzle arm 12 along an annular path.

The polishing agent is conveyed, fed by a pump 15, to the spray nozzles 10 from the polishing agent container 14 through a connecting tube 16, manifold 17, supply channels 18 and nozzle arms 12, the inner end 12" of the nozzle arms 12 being in flow connection with the supply channels 18. The nozzle arm 12 is connected to the supply channel 18 by a rotating connector. The supply channels 18 are connected to the manifold 17 that is connected through a connecting tube 16 and pump 15 to the polishing agent container 14. The polishing agent sprays 11 are provided by means of pressure generated by the pump 15, and the spray nozzles 10 direct the polishing agent spray 11 to the tyre 2 of the vehicle. The operation of the pump 15 is controlled by a control unit 19 that is connected to the pump 15 via a control line 20 that is shown as an arrow 20 from the control unit 19 to the pump 15. The operation of the rotating motor 13 is also controlled by a control unit 19 that is connected to the rotating motor 13 via a control line 21 that is shown as an arrow 21 from the control unit 19 to the rotating motor 13.

When using the polishing device 9, the control unit 19 is arranged to start the pump 15 when the polishing device 9 and especially the spray nozzles 10 are at the location of the tyre 2. The control unit 19 may obtain information on the location of the tyre from a special detection unit that detects the location of the tyre and may be part of the polishing device 9 or washing apparatus 3. Simultaneously, the control unit 19 also starts the rotating motor 13, whereby the spray nozzle 10 at the outermost end 12' of the nozzle arm 12 rotates as shown schematically in FIG. 3 in the rotating direction shown by arrow R, for instance, along a path 22 in the shape of the vehicle 1 tyre 2 and sprays polishing agent to the side 2' of the tyre 2. The spray nozzle 10 is rotated at least once, but preferably at least twice or more around the circumference of the vehicle 1 tyre 2. To achieve a good polishing result, the tyre is washed before polishing. If the side 2' of the vehicle 1 tyre 2 is washed before applying the polishing agent on the side 2' of the tyre 2, only one or a few spray nozzle 10 rounds, 2 to 4, for example, around the circumference of the tyre 2 suffice to achieve a good polishing result. After the spray nozzle 10 has been rotated a specific number of rounds around the circumference of the tyre 2, the control unit 19 stops the rotating motor 13 and pump 15. While the tyre is being polished, both the vehicle 1 and the framework 4 of the washing apparatus 3, to which at least some of the parts belonging to the polishing device 9 are arranged, remain stationary.

Figure 3:
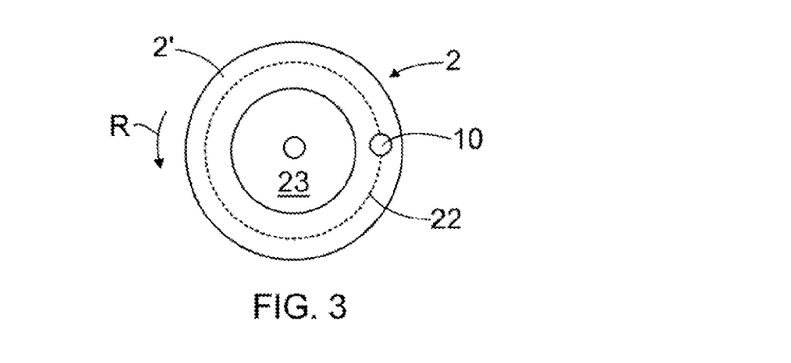
FIG. 3 is a schematic side view of a vehicle tyre.

FIG. 3 is a schematic view of the spray nozzle 10 rotating counter-clockwise, but the rotation direction of the spray nozzle 10 may naturally also be clockwise.

In the embodiment shown in FIGS. 1 and 2, the spray nozzles 10, nozzle arms 12, rotating motors 13, polishing agent container 14, connecting tube 16, manifold 17, supply channels 18 and control unit 19 thus form a polishing device 9 for polishing a vehicle 1 tyre 2 with the spray nozzles 10 forming the actual application means of the polishing device 9 for applying the polishing agent to the tyre and the other parts forming means for supplying the polishing agent to the spray nozzles 10 or means for rotating the spray nozzles in relation to the tyre 2 of the stationary vehicle 1. In the embodiment of FIGS. 1 and 2, the polishing device 9 is arranged as part of the washing apparatus 3. However, the polishing device 9 could also be implemented as a device that is entirely separate from the washing apparatus 3.

In the polishing device 9 shown in FIG. 1, the spray nozzles 10 form polishing agent application means for applying the polishing agent to the side 2' of the vehicle 1 tyre 2. Instead of the spray nozzles 10, one or more brushes or sponges for applying polishing agent on the side 2' of the vehicle 1 tyre 2 could also be used to apply the polishing agent to the side 2' of the vehicle 1 tyre 2, and said brush or sponge would rub the polishing agent supplied through the supply channel 18 and fastening arm of the brush or sponge corresponding to the nozzle arm 12 to the side of the tyre.

Figure 4:
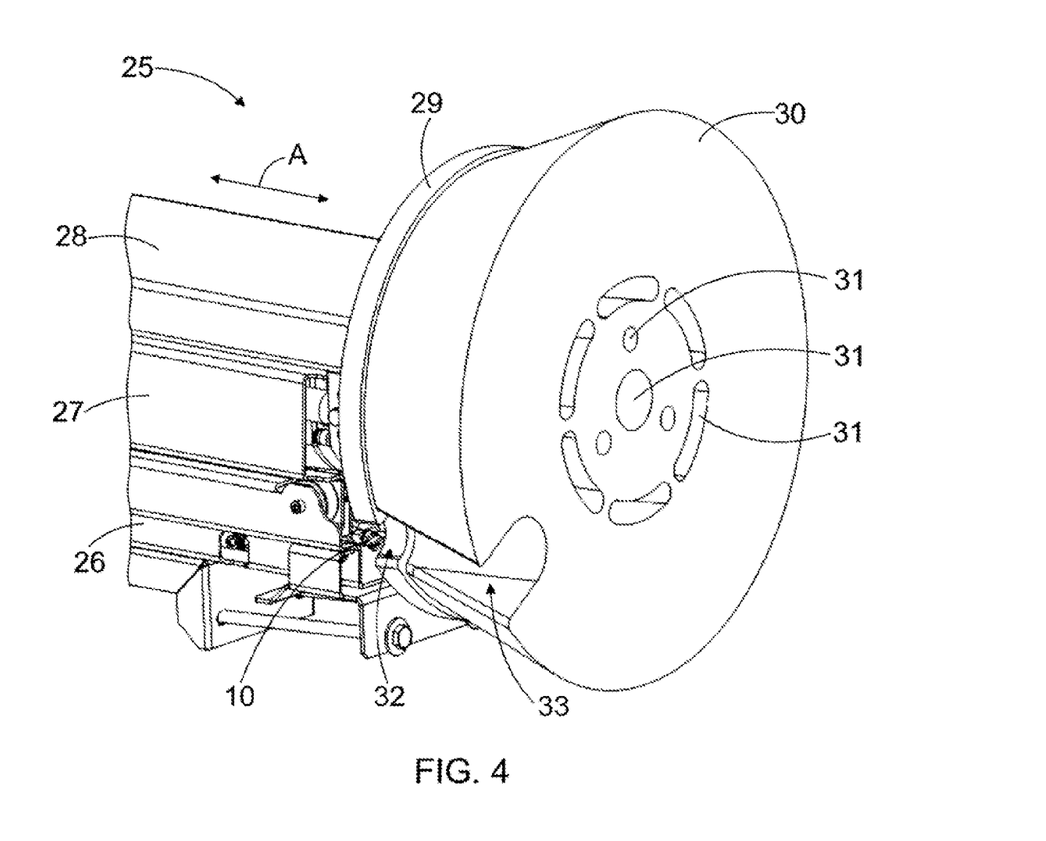
FIGS. 4 and 5 are schematic diagonal front views of, a vehicle tyre washing device with a vehicle tyre polishing device arranged thereto.
Figure 5:
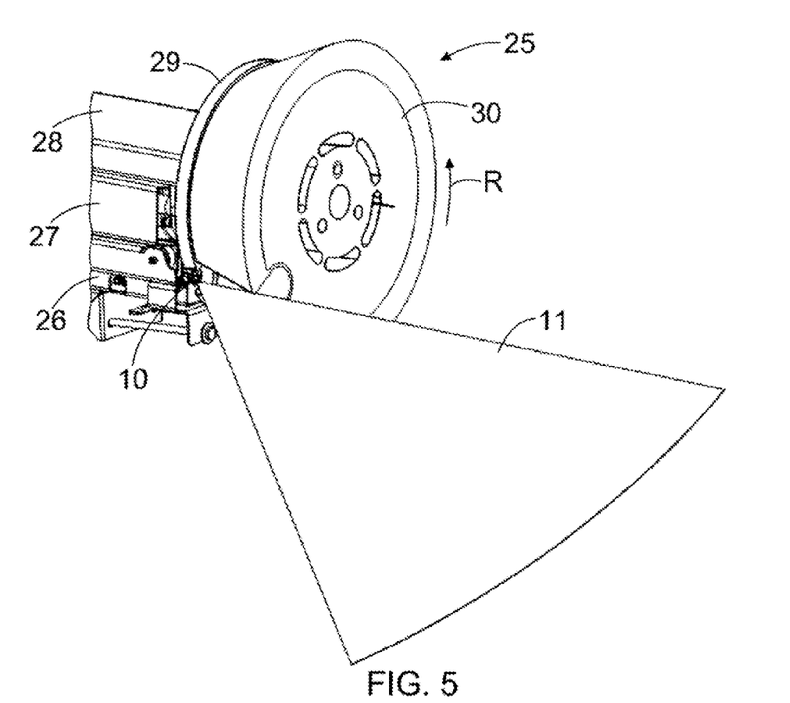
Figure 6:
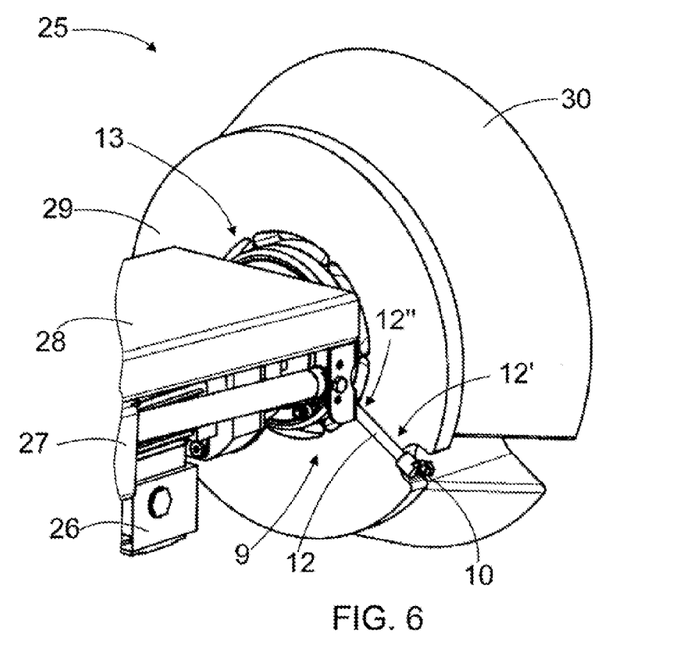
FIG. 6 is a schematic diagonal back view of the vehicle tyre washing device according to FIGS. 4 and 5.

FIGS. 4 and 5 are schematic diagonal front views of a vehicle 1 tyre washing device 25 with a vehicle 1 tyre 2 polishing device 9 arranged thereto and FIG. 6 is a schematic diagonal back view of the vehicle 1 tyre washing device 25 according to FIGS. 4 and 5. The vehicle 1 tyre washing device 25 comprises a framework 26 and, as seen in FIGS. 4 and 5, a first carriage 27 supported to the top part of the framework 26 and a second carriage 28 supported to the top part of the first carriage 27 in such a manner that the first carriage 27 can move in the direction shown schematically by arrow A in relation to the framework 26 and the second carriage 28 can move in the direction shown schematically by arrow A in relation to both the framework 26 and the first carriage 27. At the end of the second carriage 27, a backing plate 29 is attached with a tyre washing brush 30 fastened to it, and feed openings 31 are arranged in the mid-section of the brush in such a manner that tyre washing water and agent can be fed through the tyre washing brush 30 between the tyre washing brush 30 and vehicle tyre. For the sake of clarity, FIGS. 4 to 6 do not show individual bristles of the tyre washing brush 30. The tyre washing device 25 further comprises a rotating motor 13 for rotating the backing plate 29 and the tyre washing brush 30 fastened thereto during the washing of the vehicle tyre for instance in the direction shown schematically by arrow R in FIG. 5 or back and forth.

The tyre washing device 25 of FIGS. 4 to 6 further comprises a nozzle arm 12 located on the back side of the backing plate 29, as seen in relation to the tyre washing brush 30, with a spray nozzle 10 arranged at its outermost end 12' for spraying polishing agent on the side 2' of the vehicle 1 tyre 2. The spray nozzle 10 arranged at the outermost end 12' of the nozzle arm 12 is arranged to settle on the back side of the backing plate 29 on its outer circumference, and borings 32 and 33 are arranged on the outer circumference of the backing plate 29 as well as on the outer circumference of the tyre washing brush 30 in such a manner that the spray nozzle 10 on the outermost end 12' of the nozzle arm 12 resides inside the outer circumference of both the backing plate 29 and tyre washing brush 30. For the sake of clarity, FIGS. 4 to 6 do not show the supply channel 18, pump 15, polishing agent container 14 or control unit 19 connected to the spray nozzle 10 and nozzle arm 12. The innermost end 12" of the nozzle arm 12 can be arranged to the motor 13 or backing plate 29, for instance.

The operating principle of the tyre washing device 25 according to FIGS. 4 to 6 is essentially as follows. When starting the washing of a vehicle 1 tyre 2, feed carriages 27 and 28 are suitably moved with respect to the framework 26 and/or each other in such a manner that the tyre washing brush 30 of the tyre washing device 25 moves toward the vehicle 1 tyre 2 to be washed. When the tyre washing brush 30 comes into contact with the tyre 2 or preferably slightly before the tyre washing brush 30 comes into contact with the tyre 2, washing water supply is started through the tyre washing brush 30 and the rotating motor 13 is started, whereby the tyre washing brush 30 begins to rotate in relation to the tyre 2. After this the tyre washing brush 30 is pressed against the tyre 2 and its rim 23 while the tyre washing brush 30 is rotated and washing water is supplied through the tyre washing brush 30. When the tyre washing program made for the tyre washing device 25 is completed, washing water supply through the tyre washing brush 30 is stopped and the tyre washing brush 30 is moved away from the tyre 2 by suitably moving the feed carriages 27 and 28 with respect to the framework 26 and/or each other.

After the tyre is washed, the side 2' of the tyre 2 can be polished with the polishing agent. To start polishing the tyre, the pump 15 is started to supply the polishing agent from the polishing agent container 14 to the spray nozzle 10. The rotating motor 13, if it was switched off after the tyre washing, is started again, in which case the backing plate 29 and with it, the tyre washing brush 30, nozzle arm 12 and spray nozzle 10 also start to rotate in relation to the tyre 2. Polishing agent is sprayed from the spray nozzle 10 through the boring 32 in the backing plate 29 and the boring 33 in the tyre washing brush 30 toward the side 2' of the tyre 2 past the bristles in the tyre washing brush 30, whereby the spray nozzle 10 provides a polishing agent spray 11 toward the side 2' of the tyre 2 as shown schematically in FIG. 5. As the motor 13 rotates, the spray nozzle 10 moves in relation to the tyre 2 along an annular path 22 shown schematically in FIG. 3 and sprays polishing agent on the side 2' of the tyre 2. The entire side of the tyre 2 is polished when the spray nozzle 10 rotates at least once around the circumference of the tyre 2, as already stated earlier.

According to an embodiment, prior to starting to apply the polishing agent, the tyre washing brush 30 is moved into contact with the vehicle 1 tyre 2 in such a manner that the tyre washing brush 30 presses lightly against the rim 23 of the vehicle 1 tyre 2. The tyre washing brush 30 can be moved toward the vehicle 1 tyre 2 by suitably moving the feed carriages 27 and 28 with respect to the framework 26 and/or each other toward the tyre 2, if the tyre washing brush 30 has already been moved away from the tyre 2 after washing the tyre 2. Alternatively, if the tyre washing brush 30 is still in contact with the tyre 2 after the tyre 2 has been washed, the tyre washing brush 30 can be moved slightly away from the tyre 2. The force, with which the tyre washing brush 30 is pressed against the rim 23 of the tyre 2 during polishing, may be the same as used during tyre washing, in which only the rim 23 of the tyre 2 was washed. The bristles of the tyre washing brush 30 then essentially cover only the rim 23 of the tyre 2 and do not extend to the area of the side 2' of the tyre 2. Alternatively, if, during the washing of the tyre 2, the side 2' of the tyre 2 was also washed, in which case the tyre washing brush 30 was pressed against the tyre 2 using a force that bent the bristles of the tyre washing brush 30 against the side 2' of the tyre 2, the tyre washing brush 30 could be pulled slightly away from the tyre 2 so that the bristles of the tyre washing brush 30 essentially cover only the rim 23 of the tyre 2.

As the tyre washing brush 30 presses against the rim 23 of the vehicle 1 tyre 2, the bristles of the tyre washing brush 30 cover the rim 23 of the vehicle 1 tyre 2, whereby the tyre washing brush 30 prevents the polishing agent spray from ending up on the rim 23 of the tyre 2. In this embodiment, the tyre washing brush 30 forms a means for preventing the application of the polishing agent on the rim 23 of the vehicle 1 tyre 2 by covering the rim 23 of the vehicle 1 tyre 2 during the application of the polishing agent. After the polishing agent has been applied to the side 2' of the tyre 2, the tyre washing brush 30 can be moved away from the tyre 2 by moving the carriages 27 and 28 to the position where they are when the tyre washing device 25 is not used.

In the solution of FIGS. 4 to 6, the tyre polishing device 9 is thus connected to the tyre washing device 25 at least in respect of some components, such as the nozzle arm 12 and spray nozzle 10. The tyre washing device 25 can be arranged to be part of a washing apparatus that may also comprise other devices intended for washing or drying a vehicle and that moves in relation to a stationary vehicle. The tyre washing device 25 can also be an independent device separate from other devices intended for washing or drying a vehicle. In both cases, one of the tyre washing devices 25 shown herein is preferably positioned on each side of the vehicle.

The spray nozzle 10 is preferably selected so as to provide the flat fan-shaped spray shown schematically in FIG. 5. The spread angle of the spray nozzle 10 may be 25 to 50 degrees, for example. The spread angle of the nozzle may be dimensioned proportional to the used spray pressure, whereby a specific nominal pressure uses a specific spread angle.

Figure 7:
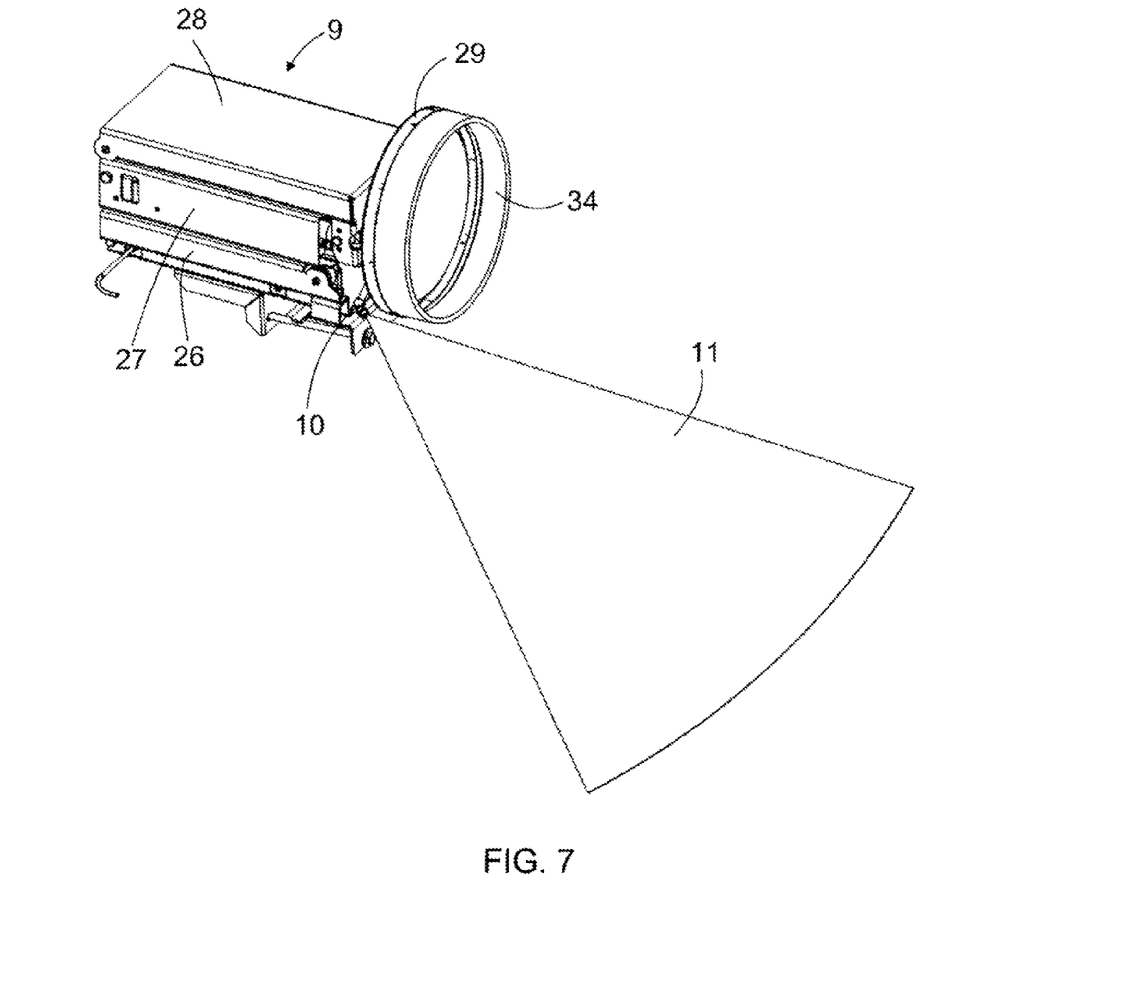
FIG. 7 is a schematic diagonal front view of a second vehicle tyre polishing device.

In the solution of FIGS. 4 to 6, it is possible to affect the spray distance formed between the tyre 2 side 2' and spray nozzle 10 by moving the carriages 27 and 28 in relation to the framework 26 and/or each other. By varying the spray distance and also the a spray pressure, it is possible to affect the force or pressure, with which the polishing agent spray 11 hits the side 2' of the tyre 2. Further, the possibility of changing the spray distance makes it possible to affect the width of the polishing spray at the side 2' of the tyre 2, whereby it is possible to ensure that the width of the polishing spray at the side 2' of the tyre 2 corresponds essentially to the dimension of the side 2' of the tyre 2 in the radial direction of the tyre 2. The side 2' of the tyre 2 will then be essentially entirely treated with the polishing agent in such a manner, however, that the polishing agent does not essentially reach the tyre space, the rim 23 of the tyre 2 or the side of the vehicle 1. By altering the spray distance, it is thus possible to easily polish tyres of different diameter and/or profile with the same polishing device. In the example of FIGS. 1 and 2, the polishing device 9 is fixed to the washing apparatus 3, but the polishing device according to FIGS. 1 and 2 can also be arranged to be movable with respect to the framework 4 of the washing apparatus 3 in such a manner that the distance of the spray nozzle from the tyre 2 of the vehicle 1 can be altered on the basis of the tyre size and/or profile, FIG. 7 is a schematic diagonal front view of a second vehicle 1 tyre 2 polishing device 9. The polishing device 9 shown in FIG. 7 resembles the tyre washing device 25 shown in FIGS. 4 and 5 otherwise, except that the polishing device 9 shown in FIG. 7 does not comprise a tyre washing brush 30, but the tyre washing brush 30 has been replaced by a guard ring 34 that will be described later in r more detail.

In the manner of FIGS. 4 and 5, the polishing device 9 shown in FIG. 7 comprises a framework 26, a first carriage 27 supported to the top part of the framework 26 and a second carriage 28 supported to the top part of the first carriage 27 in such a manner that the first carriage 27 can move with respect to the framework 26 and the second carriage 28 can move with respect to both the framework 26 and first carriage 27. A backing plate 29 is attached to the end of the second carriage 28. The polishing device 9 further comprises a nozzle arm 12 with a spray nozzle 10 arranged at its outermost end 12' for spraying polishing agent on the side 2' of the vehicle 1 tyre 2. The innermost end 12" of the nozzle arm 12 can be arranged to the motor 13 or backing plate 29, for instance. The polishing device 9 shown in FIG. 7 further comprises a guard ring 34 arranged with bearings to the outer circumference of the backing plate 29 in such a manner that the backing plate 29 can turn with respect to the stationary guard ring 34, when the guard ring 34 is pressed against the rim 23 of the vehicle 1 tyre 2 during the polishing of the tyre 2, as will be described in more detail later. The guard ring 34 is arranged to extend around the entire outer circumference of the backing plate 29 and to a distance outward from the backing plate 29, away from the framework 26 of the polishing device 9.

When using the polishing device 9 according to FIG. 7 to polish the side 2' of a vehicle 1 tyre 2, the guard ring 34 is moved toward the vehicle 1 tyre 2 in, such a manner that the guard ring 34 presses lightly against the rim 23 of the vehicle 1 tyre 2 and surrounds the rim 23 of the tyre 2. The guard ring 34 can be made of soft rubber, for example, so that the guard ring 34 does not damage the rim 23. The guard ring 34 can be moved toward the vehicle 1 tyre 2 by suitably moving the feed carriages 27 and 28 in relation to the framework 26 and/or each other toward the tyre 2. As the guard ring 34 presses lightly against the rim 23 of the vehicle 1 tyre 2, the guard ring 34 covers the rim 23 of the vehicle 1 tyre 2, whereby the guard ring 34 prevents the polishing agent spray from ending up on the rim 23 during the application of the polishing agent. When the backing plate 29 and spray nozzle 10 of the polishing device 9 rotate in relation to the tyre 2 during the application of the polishing agent, the guard ring 34 remains in place in relation to the tyre 2 by means of the bearings between the guard ring 34 and backing plate 29, and the guard ring 34 does not rotate with respect to the tyre 2 and, thus, cannot scratch the rim 23. In the embodiment shown in FIG. 7, the guard ring 34 thus forms a means that prevents the application of the polishing agent on the rim 23 of the vehicle 1 tyre 2 by covering rim 23 of the vehicle 1 tyre 2 during the application of the polishing agent. On the outward facing surface of the backing plate 29, in the area defined by the guard ring 34, it is possible to arrange a plastic guard plate, for instance, to prevent the backing plate 29 from coming into contact with the parts of the tyre 2 rim 23, if the centre of the 23 comprises parts extending outward from the rim 23, for instance.

In the examples shown in the figures, the polishing device 9 comprises only one spray nozzle 10 on both sides of the vehicle 1. However, the polishing device 1 can also comprise more than one spray nozzle 10, two or three spray nozzles, for example, on both sides of the vehicle 1. The spray nozzles 10 on the same side of the vehicle 1 can then be arranged in such a manner that they are around the circumference of a ring at a distance from each other. Similarly, it is, possible to place one or more of the above-mentioned sponges or brushes useable instead of the spray nozzles 10 on both sides of the vehicle.

The present polishing devices 9 are simple in structure and, thus, reliable. As already stated above, the present polishing devices 9 can be implemented as devices that are entirely separate from the washing apparatus 3 or they can easily be integrated as part of a portal-type washing apparatus, for example, in which case they are also easy to retrofit into washing apparatuses already in use. At the same time, it is possible to avoid a problem arisen in at least some of the known solutions, that is, the increase in the space reserved for the washing apparatus or in the length of the wash tunnel, when it has been necessary to reserve approximately 2 to 3 meters extra space for the polishing device.

After the polishing agent has been applied to the sides 2' of the vehicle 1 tyres 2, the polishing agent that has possibly ended up on the sides and rims of the vehicle can be removed. The polishing agent that has possibly ended up on the sides and rims of the vehicle can be removed for instance by spraying drying wax on the vehicle and then blowing drying air against the vehicle. The drying wax flushes the polishing agent away from the sides of the vehicle 1 and the rims 23 of the tyres, but the polishing agent remains on the sides of the tyres. The drying wax can be sprayed on the surface and tyres of the vehicle from drying wax nozzles 24 arranged on the framework 4 of the washing apparatus 3 shown in FIG. 1, for example, and the drying air can be blown against the vehicle from air nozzles 8 shown in FIG. 1, for example.

In the embodiment of FIG. 1, the polishing device 9 is connected to a portal-type washing apparatus 3 that comprises both washing devices for washing a vehicle and drying devices for drying a vehicle. The present polishing devices 9 could also be connected to a washing apparatus 3 with no portal-type framework, in which case the washing devices for washing the sides of a vehicle and the drying devices for drying the sides of a vehicle are positioned on vertical poles on both sides of the vehicle, and the means for washing and drying the upward facing surfaces of the vehicle and possibly the front and rear ends of the vehicle can be supported to the ceiling structures of the washing location, for instance. The present polishing devices can also be placed in connection with a drying apparatus intended solely for drying a vehicle and comprising means for blowing drying air toward the vehicle. The means for applying the drying wax can then be placed either on the same drying apparatus or on another structure of the washing or drying location before said drying equipment. When placing the polishing device 9 in connection with washing or drying apparatus, the structure of said washing or drying apparatus may also be of some other type than that presented above.

According to an embodiment, the polishing device may comprise either one application means or two or more application means placed side by side in the vertical or horizontal direction, which are preferably spray nozzles. In this embodiment, said one or more application means are moved at the location of the vehicle tyre in relation to the tyre of the stationary vehicle in either horizontal direction, that is, in the longitudinal direction of the vehicle, or in the vertical direction, that is, in the elevation of the vehicle, while simultaneously supplying polishing agent through the application means to the tyre of the vehicle. The polishing agent is thus applied on a rectangular area, inside the outline of which the tyre being polished is located. It is also possible that the polishing agent is applied through only one stationary spray nozzle. The polishing agent that has ended up on the rim of the tyre and possibly on the side of the vehicle can be removed as described above.

In some cases, the features disclosed in this specification may be used as such, regardless of other features. On the other hand, the features disclosed in this specification may, when necessary, be combined to form various combinations.

It is obvious to a person skilled in the art that as technology advances, the basic idea of the invention may be implemented in many different ways. The drawings and the related description are only intended to illustrate the idea of the invention. The invention may vary in detail within the scope of the claims.

The invention claimed is:

1. A polishing device for polishing a vehicle tyre, the polishing device comprising:
   at least one polishing agent application means for applying polishing agent on a side of the vehicle tyre, the at least one polishing agent application means being arranged to move in relation to the vehicle tyre of a stationary vehicle along an annular path formed by the side of the vehicle tyre,
   wherein the at least one polishing agent application means of the polishing device for applying polishing agent on the side of the vehicle tyre is arranged at a peripheral portion of a rotatable tyre washing brush intended for washing the side and rim of the vehicle tyre such that the at least one polishing agent application means rotates with the rotatable tyre washing brush.

2. A polishing device as claimed in claim 1, wherein the polishing device comprises at least one pump for feeding polishing agent to the application means and at least one motor for moving the application means in relation to the tyre of a stationary vehicle.

3. A polishing device as claimed in claim 1, wherein the application means is a spray nozzle for spraying polishing agent on the tyre of the vehicle.

4. A polishing device as claimed in claim 3, wherein the spray nozzle is arranged to direct the polishing agent to the vehicle tyre as a narrow fan-shaped spray.

5. A polishing device as claimed in claim 4, wherein the spread angle of the spray nozzle is 25 to 50 degrees.

6. A polishing device as claimed in claim 3, wherein the spread angle of the spray nozzle is 25 to 50 degrees.

7. A polishing device as claimed in claim 1, wherein at least the application means of the polishing device for applying polishing agent on the side of the vehicle tyre is arranged in a vehicle washing apparatus, which vehicle washing apparatus comprises at least one washing device for washing a vehicle and which vehicle washing apparatus is arranged to move in relation to a stationary vehicle.

8. A polishing device as claimed in claim 1, wherein the application means for applying polishing agent on the side of the vehicle tyre is arranged to apply the polishing agent on the side of the vehicle tyre through a boring formed on the outer circumference of said tyre washing brush past bristles of the rotatable tyre washing brush.

9. A vehicle tyre washing device comprising:
   a polishing device for polishing a vehicle tyre, the polishing device comprising at least one application means for applying polishing agent on a side of the vehicle tyre, the at least one application means being arranged to move in relation to the vehicle tyre of a stationary vehicle along an annular path formed by the side of the vehicle tyre,
   wherein the at least one application means is arranged at a peripheral portion of a rotatable tyre washing brush intended for washing the side and rim of the vehicle tyre such that the application means rotates with the rotatable tyre washing brush.

* * * * *